(12) United States Patent
Gomez et al.

(10) Patent No.: US 10,384,446 B2
(45) Date of Patent: Aug. 20, 2019

(54) HOUSINGS AND DETECTOR ARRAYS

(71) Applicant: Hewlett-Packard Development Company, L.P., Houston, TX (US)

(72) Inventors: Francisco Gomez, Barcelona (ES); Rafael Ulacia Portoles, Barcelona (ES); Laura Portela Mata, Sant Cugat del Valles (ES); Jose Miguel Felguera, San Cugat del Valles (ES)

(73) Assignee: Hewlett-Packard Development Company, L.P., Spring, TX (US)

(*) Notice: Subject to any disclaimer, the term of this patent is extended or adjusted under 35 U.S.C. 154(b) by 30 days.

(21) Appl. No.: 15/315,452

(22) PCT Filed: Jun. 5, 2014

(86) PCT No.: PCT/EP2014/061680
§ 371 (c)(1),
(2) Date: Dec. 1, 2016

(87) PCT Pub. No.: WO2015/185138
PCT Pub. Date: Dec. 10, 2015

(65) Prior Publication Data
US 2017/0120575 A1 May 4, 2017

(51) Int. Cl.
*B41J 2/21* (2006.01)
*B41J 2/045* (2006.01)
(Continued)

(52) U.S. Cl.
CPC ......... *B41J 2/0456* (2013.01); *B41J 2/04586* (2013.01); *B41J 2/125* (2013.01);
(Continued)

(58) Field of Classification Search
CPC ........ B41J 2/473; B41J 11/002; B41J 2/0456; B41J 2/04586; B41J 2/125; B41J 2/16579; B41J 2/2142; B41J 29/393
(Continued)

(56) References Cited

U.S. PATENT DOCUMENTS

| 4,550,322 A | 10/1985 | Tamai |
| 4,751,517 A | 6/1988 | Crean et al. |

(Continued)

FOREIGN PATENT DOCUMENTS

| KR | 200152820 Y1 * | 7/1999 |
| KR | 200152820 Y1 | 7/1999 |
| TW | M439745 U | 10/2012 |

*Primary Examiner* — Jannelle M Lebron
(74) *Attorney, Agent, or Firm* — HP Inc. Patent Department

(57) ABSTRACT

There is disclosed a housing including a plurality of compartments for housing a plurality of LEDs or photo detectors. Each compartment has a number of control pads projecting inwardly and a number of protrusions. The control pads are configured to provide a contact surface for the LEDs or photo detectors to control the alignment and position of each of the plurality of LEDs or photodiodes within each of the plurality of compartments. Each of the protrusions urges each of the plurality of LEDs or photodiodes against the respective control pads to control the alignment of the LEDs or photodiodes in the housing. A detector array including a casing, an LED housing and a photodiode housing is also disclosed.

4 Claims, 16 Drawing Sheets

(51) Int. Cl.
*B41J 2/125* (2006.01)
*B41J 2/165* (2006.01)
*G01V 8/20* (2006.01)
*G01J 1/02* (2006.01)

(52) U.S. Cl.
CPC ............. *G01V 8/20* (2013.01); *B41J 2/16579* (2013.01); *B41J 2/2142* (2013.01); *G01J 1/0271* (2013.01)

(58) Field of Classification Search
USPC .............. 347/5, 19, 102, 224, 238, 245, 263
See application file for complete search history.

(56) References Cited

U.S. PATENT DOCUMENTS

| | | |
|---|---|---|
| 7,393,095 B2 | 7/2008 | Oshima et al. |
| 7,841,687 B2 | 11/2010 | Cai et al. |
| 7,987,729 B2 | 8/2011 | Sugahara |
| 8,025,356 B2 | 9/2011 | Habashi |
| 8,262,214 B2 | 9/2012 | Doo |
| 8,529,034 B2 | 9/2013 | Matsumoto et al. |
| 2006/0158477 A1 | 7/2006 | Kusakari et al. |
| 2009/0213165 A1 | 8/2009 | Burke et al. |

\* cited by examiner (a)

(b)

HOUSINGS AND DETECTOR ARRAYS

BACKGROUND

A drop detector may be used to detect whether ink droplets ejected from a print element are deposited accurately onto a substrate.

DETAILED DESCRIPTION

Drop detectors may be used detect whether printing fluid droplets ejected from a print element are deposited accurately onto a substrate such as paper or card. The drop detector may therefore be able to diagnose nozzle health in a print element such as an inkjet printhead. In the event that a nozzle is not performing as expected, the drop detector may detect whether printing fluid droplets are ejected from those nozzles and thus the drop detector may identify faulty nozzles. The drop detector detects a droplet because the droplet intersects the path of light emitted from a light source. If no drop is detected, the light is not intersected and the photo detector detects this. If the drop is detected the photo detector detects a break in the light that reaches the photo detector because the droplet intersects the light. The drop detect can be used to determine the health of a nozzle.

A drop detector may move along a print element such as a printhead to ascertain nozzle health throughout the printhead.

In an example, a plurality of drop detectors are housed in a detector array. The benefit of using a plurality of detectors to ascertain nozzle health is that the time required ascertaining nozzle health across the print element is reduced. However, it is challenging to provide a well aligned plurality of drop detectors due to poor manufacturing tolerances and high costs.

Figure 1:
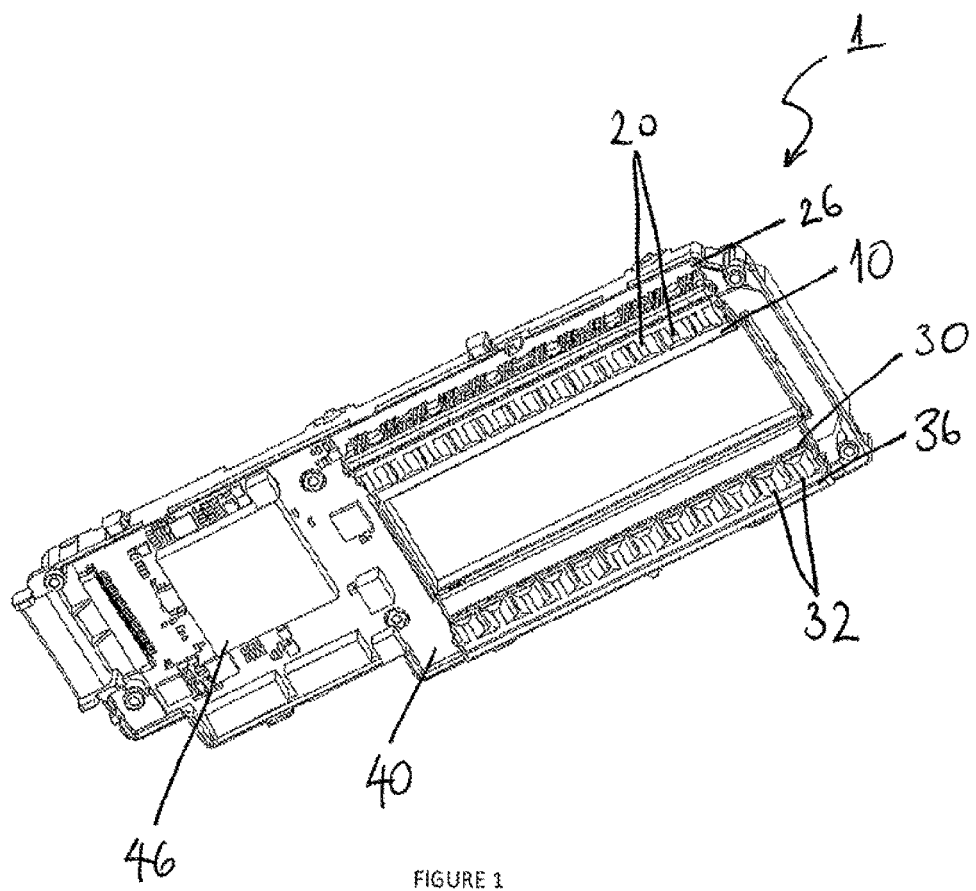
FIG. 1 illustrates an example of a first housing, a second housing and a casing.

In an example of a detector array, the detector array 1 includes a first housing 10 for a number of light sources 20 and a second housing 30 for a number of photo detectors 32 such as photodiodes, as shown for example, in FIG. 1.

In an example, the light source may be an LED and the photo detector may be a photodiode. In another example the light source may be another form of light such as a laser.

Figure 2:
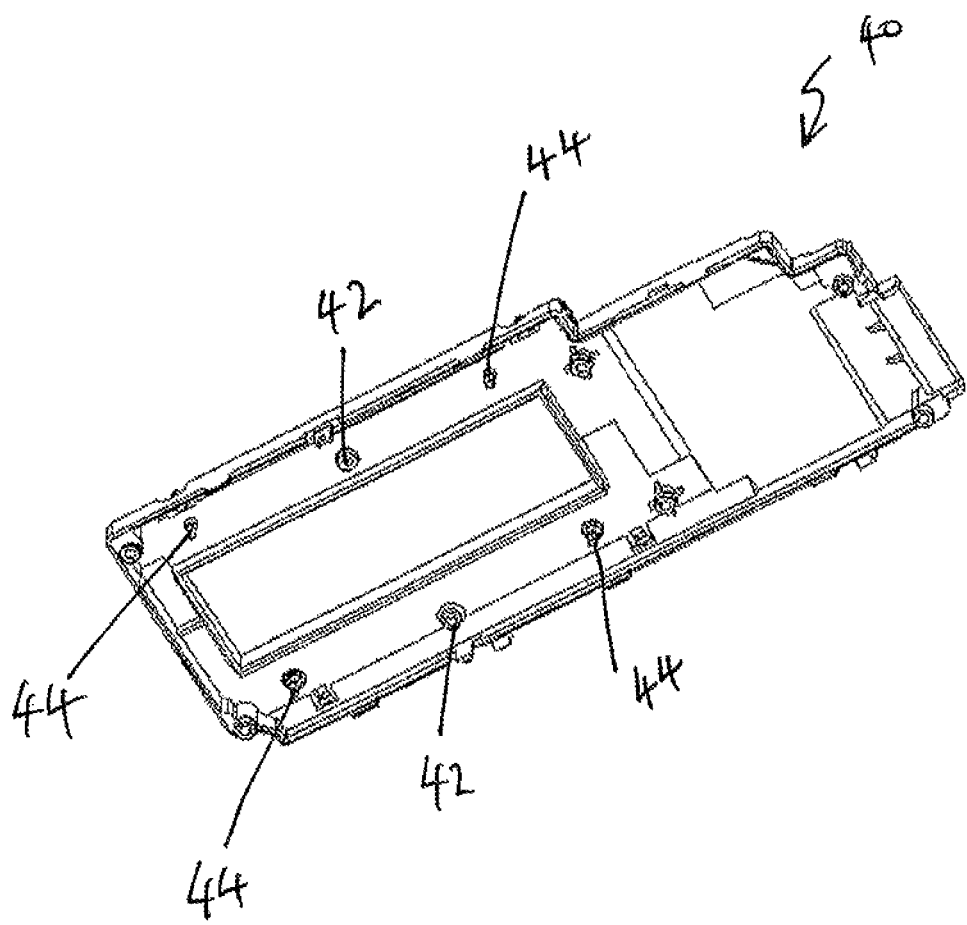
FIG. 2 illustrates an example of a casing.

The first and second housings 10, 30 are positioned in a casing 40. The casing is provided with electronic circuitry 46 to control the detector array 1. The first and second housings 10, 30 are connected to the casing 40 via a connector inserted into an aperture 42 as shown in the example illustrated in FIG. 2. The connector Spacers 26, 36 provide a gap between the housing and a back edge of the casing 40.

In an alternative example, the connector may be provided on the housing, and the complementary aperture provided in the casing.

Figure 3:
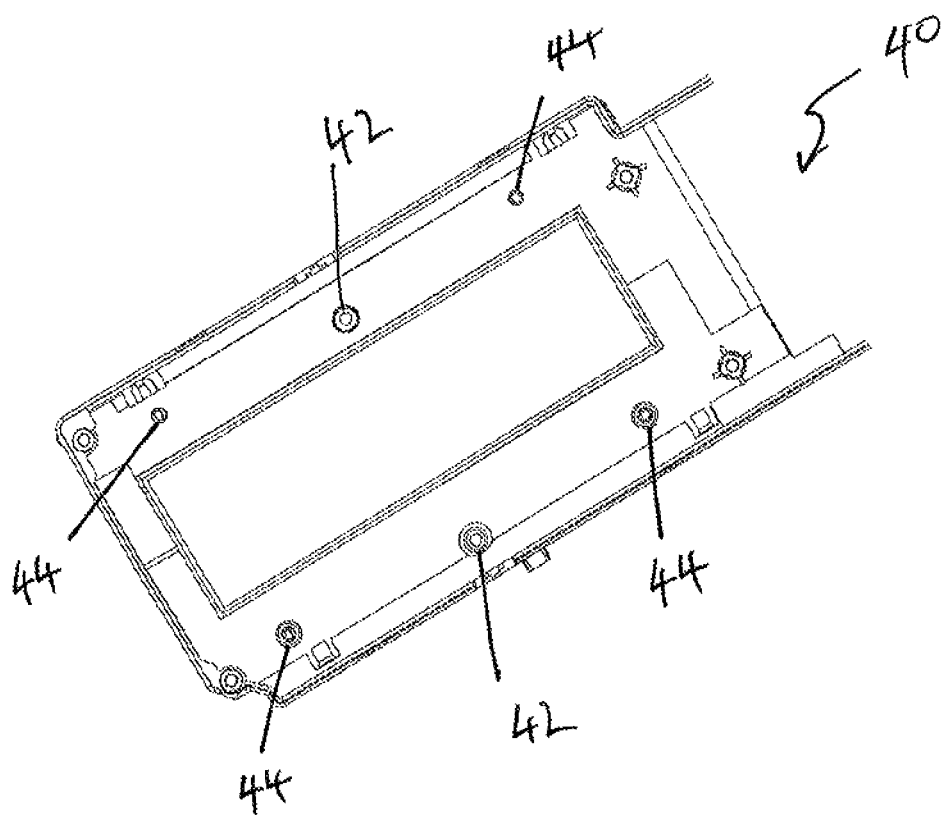
FIG. 3 illustrates an example of a casing having a number of connectors and a number of alignment elements.
Figure 4:
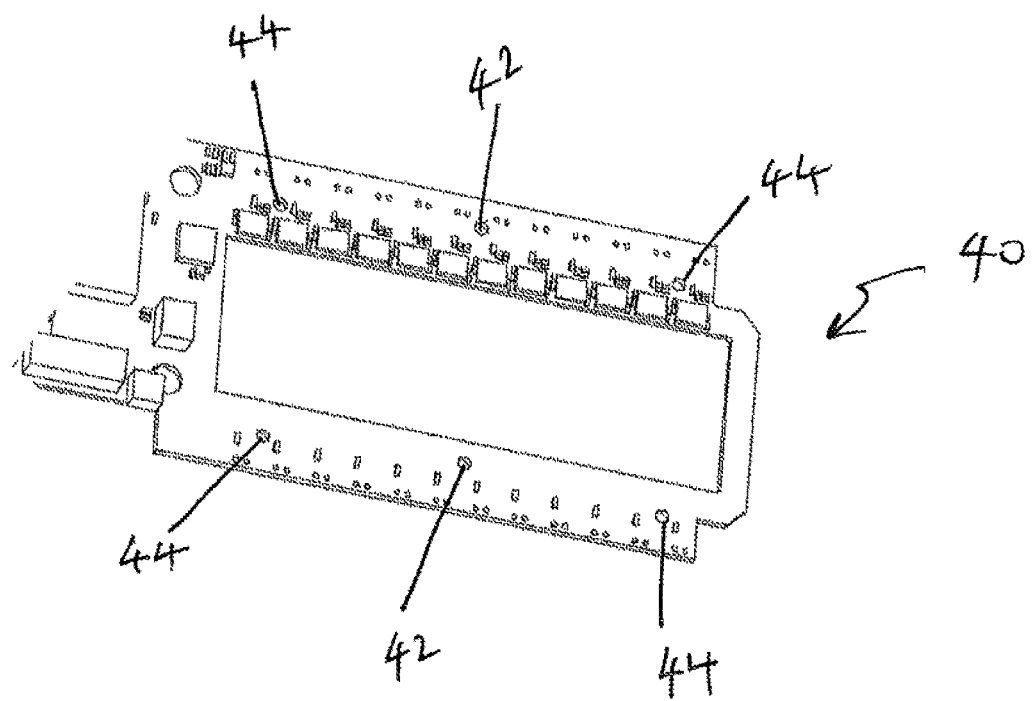
FIG. 4 illustrates an example of a casing surrounding a PCB.

A number of alignment elements 44 are provided either on the casing 40 or on the housing 10, 30 as shown in FIGS. 3 and 4. The alignment elements 44 are located at opposing ends of the housings 10, 30 and are used to align the housings 10, 30 relative to the casing. Furthermore, the alignment elements 44 are used to align the first housing 10 and the second housing 30 in a substantially parallel, opposed relationship with a space between them such that each LED in the first housing 10 is aligned opposite a photodiode in the second housing 30.

The alignment elements 44 may be pins. The pins provide fine tuning or levelling of the insertion of the housings 10, 30 into the casing 40. In one example, two pins are provided for each housing 10, 30.

The pins may also be provided with bevelled edges in order to allow insertion of a pin into a housing in a particular way.

A connector 42 is provided to connect the housings 10, 30 to the casing 40. The connector 42 may be a screw and it may be used to control gaps between the housings 10, 30 and the casing 40 in a z-direction (where the z-direction is normal to the largest face of the casing 40).

Figure 5:
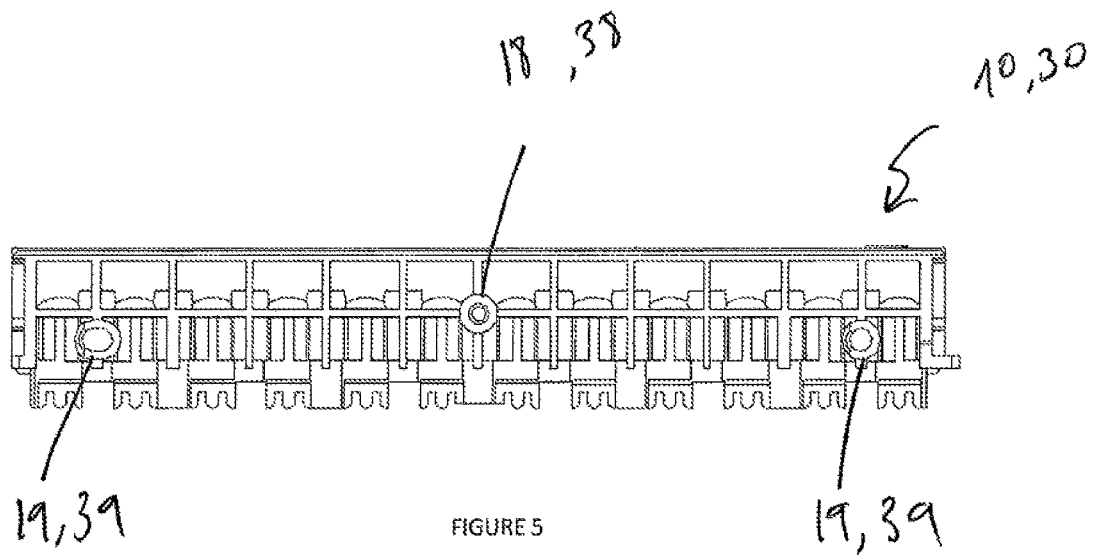
FIG. 5 illustrates an example of connector slots in a housing.

The housings 10, 30 have an aperture 18, 38 for receiving the screw or other fixing means inserted through the aperture in the casing as shown in FIG. 5. The housings 10, 30 are also provided with apertures 19, 39 configured to receive the alignment elements 44. The apertures 18, 38, 19, and 39 are shaped to complement the screw or other fixing means inserted through the apertures 42 and alignment elements 44.

The pins may be shaped such as to allow the housing 10, 30 to be inserted onto the pins in one predefined orientation. Additionally, the shaped pins provide an element of manufacturing tolerance.

The pins may alternatively be provided on the housing 10, 30; complementary apertures instead being provided in the casing 40.

The casing 40 may also include electronic circuitry and connectivity to power means to power the LEDs and photo detectors.

Figure 6:
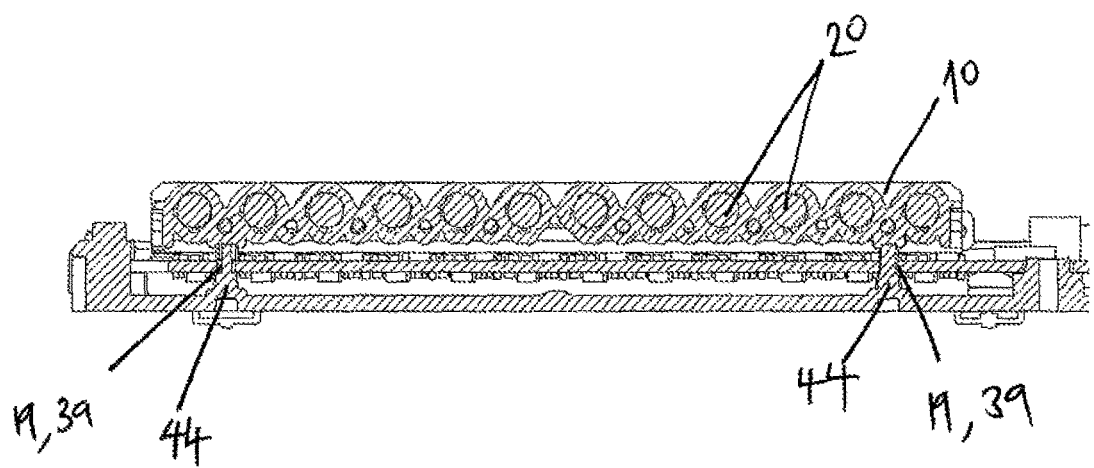
FIG. 6 illustrates a cross-section view of an example of a housing connected to a casing, showing the alignment elements.
Figure 7:
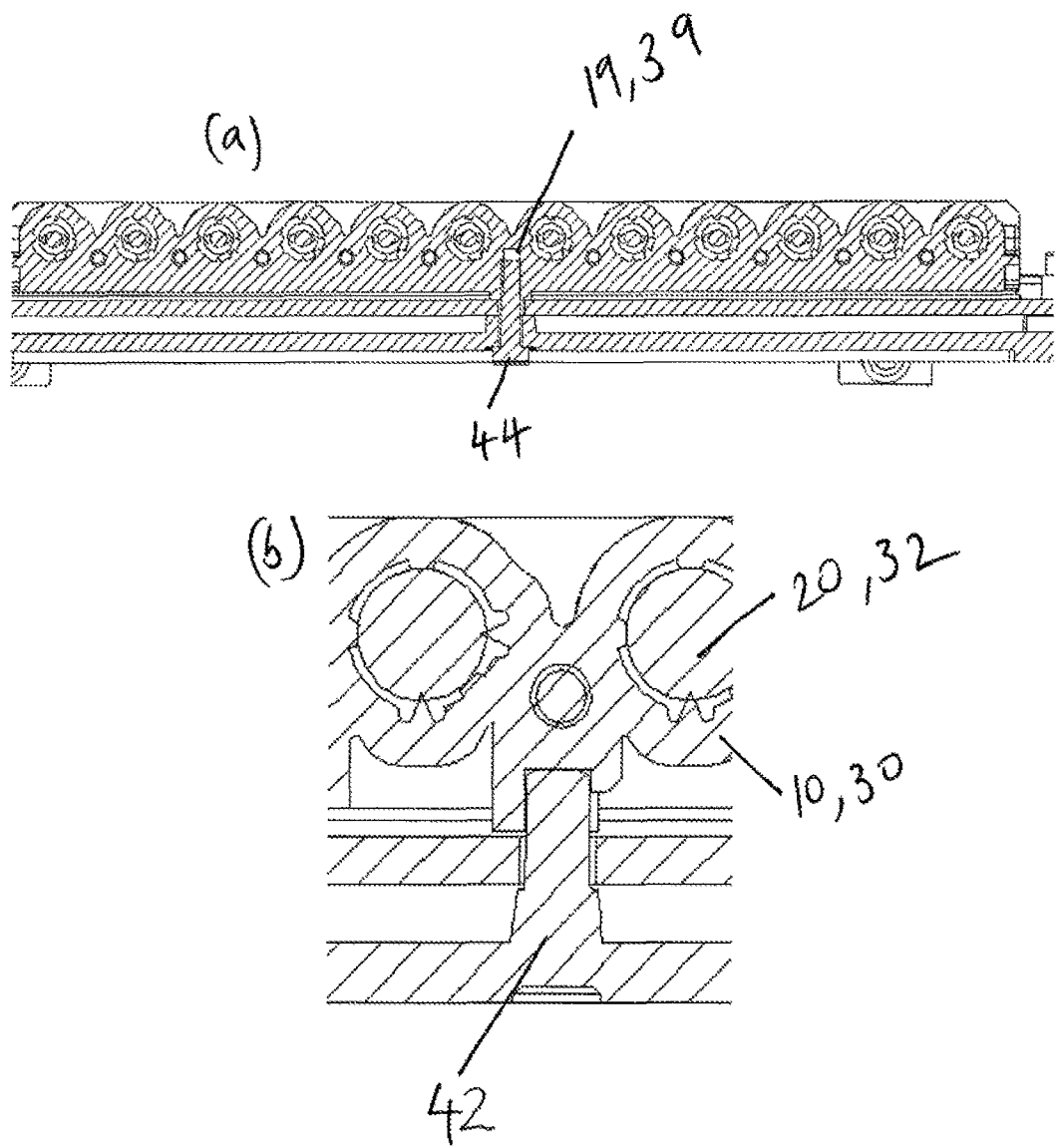
FIGS. 7 (a) and (b) illustrate an example of the alignment elements.
Figure 8:
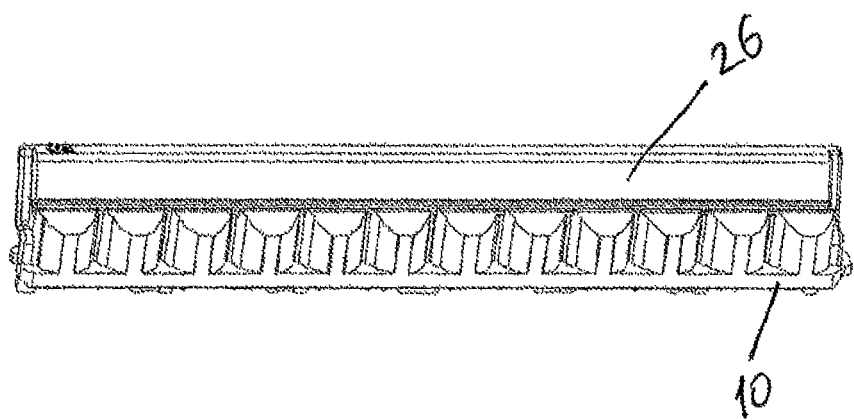
FIG. 8 illustrates an example of a spacer.

FIGS. 6 and 7 (a) illustrate the alignment elements 44 and corresponding apertures 19, 39. The centrally located connector 42 is inserted into the aperture to thereby connect the housings 10, 30 to the casing 40. Furthermore, the connector acts as a pivot point or fulcrum for aligning or levelling the housings 10, 30 relative to the casing 40 and relative to the opposing housing. FIG. 7 (b) illustrates the connector 42. The alignment elements 44 enable accuracy of alignment between of each housing in the casing and the connector allows adjustment of the housing in the z-direction relative to the casing.

The pins 44 are screwed into the housing apertures 19, 39 varying amounts to align the housings in the casing and relative to the opposing housing. The screw thread determines the level of precision in aligning the housings 10, 30 relative to the casing 40.

The pins provide additional alignment of each housing in a direction along a longitudinal axis of the pins. The pins may be screwed into the housing varying amounts in order to facilitate good alignment of the housing in the casing. Furthermore, the alignment of each housing may be varied relative to the casing in order to achieve good alignment between opposed light sources and photo detectors.

In one example, a space is provided between a back edge of each of the housings and an edge of the casing to ensure that light sources or photo detectors inserted into the housings do not come into contact with the casing.

Spacers 26, 36 provide a gap between the housing and a back edge of the casing 40 so that the casing does not interfere with the alignment light sources and photo detectors in their respective housings 10, 30 as shown in FIG. 6.

Figure 9:
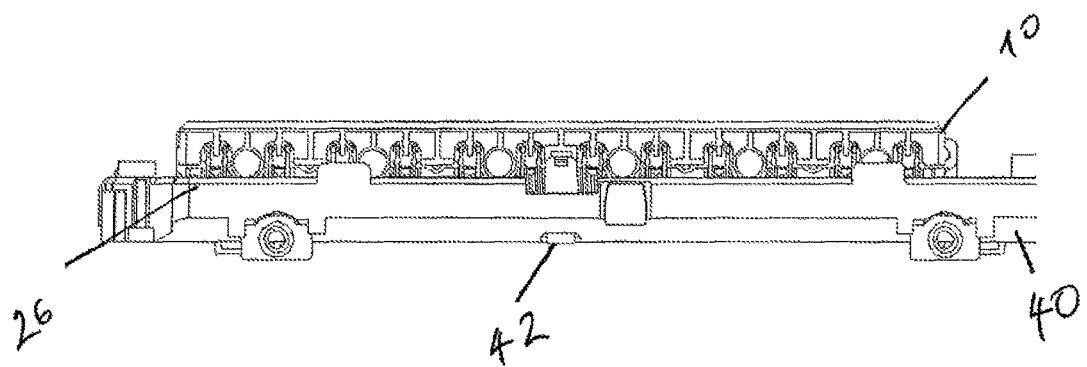
FIG. 9 illustrates a perspective view of an example of a cover of the housing.
Figure 10:
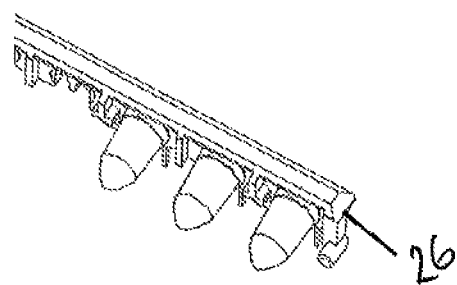
FIGS. 10 (a) and (b) illustrate an example of a spacer.
Figure 10:
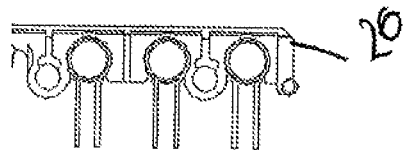

FIG. 9 illustrates an example of a first housing 10 arranged on the casing 40 with a spacer 26 separating a back portion of the first housing from the casing 40. FIG. 10 illustrates a spacer 26 having a back stop for an LED or photodiode. The back stop may be shaped to complement the shape of the LED or photodiode.

Figure 11:
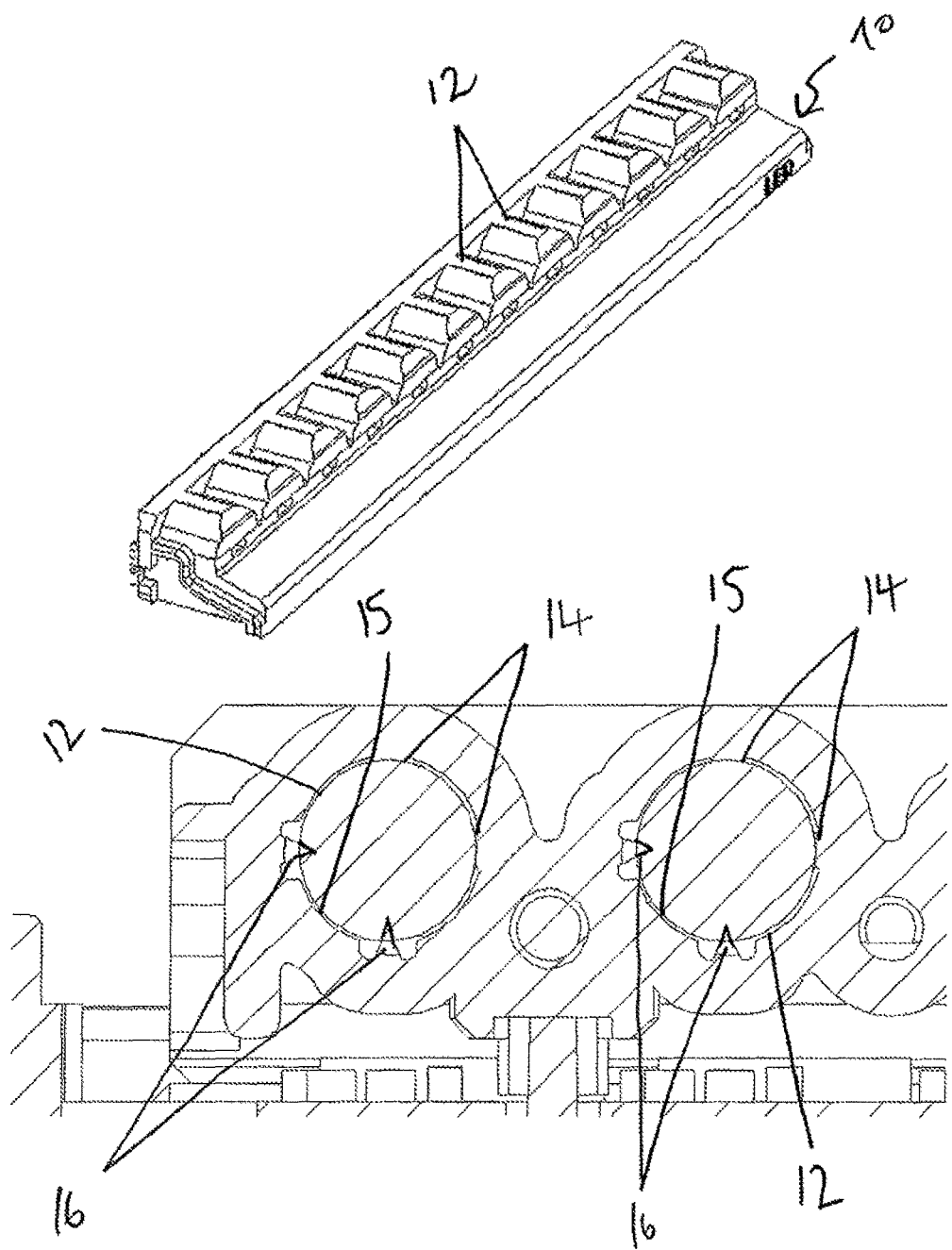
FIG. 11 illustrates a perspective view and a cross-section view of an example of an LED housing showing a number of compartments.

An example of a first housing including twelve compartments 12 for LEDs 20 is shown in FIG. 11. The photo detector housing includes the same features as the first housing but the second housing is adapted to receive photodiodes.

Figure 12:
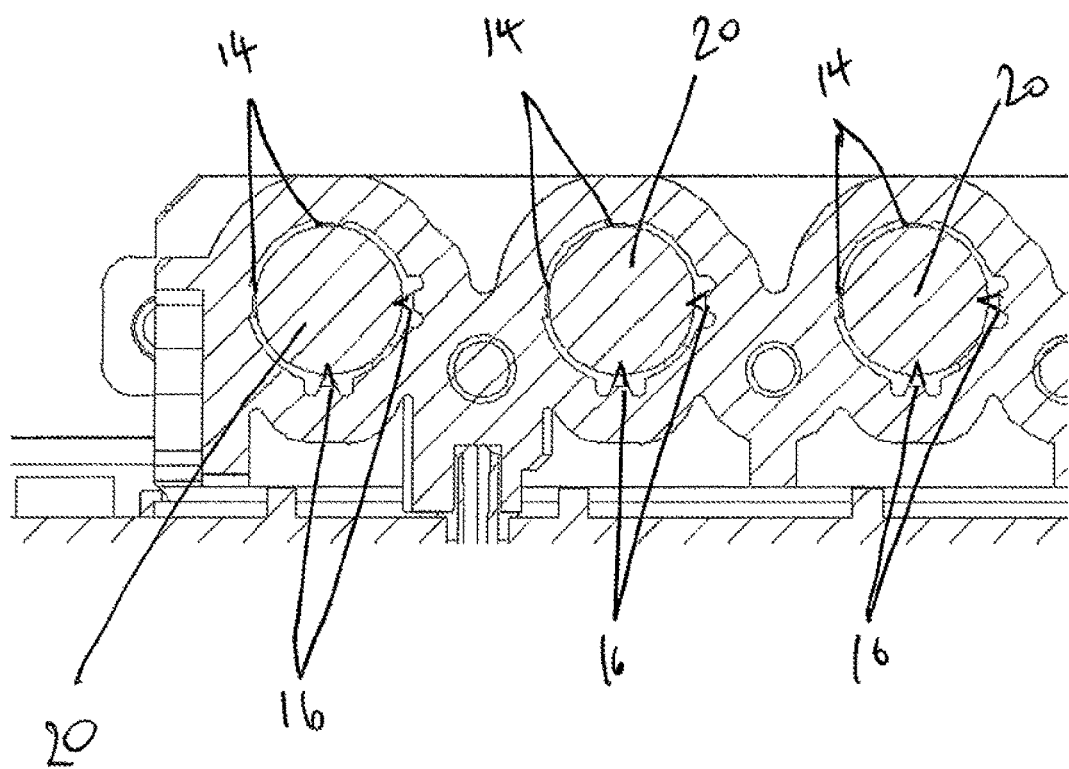
FIG. 12 illustrates a cross-section view of an example of a light source such as an LED inserted into a compartment.

The housing includes a plurality of compartments 12 for housing a plurality of LEDs 20 or photodiodes. Each compartment has a number of control pads 14, 15 projecting inwardly and a number of protrusions 16 also projecting inwardly as shown in detail in the example shown in FIG. 12. In one example, the control pads 14 are formed on the inner surface of the compartment 12 and they have a polygonal shape in cross section. It should be understood that other shapes of control pads for providing control of the alignment of an LED or photodiode in the compartment are also envisaged. The control pads 14 determine the alignment of the LEDs 20 or photodiodes in the compartments.

In one example, at least two control pads are provided on the inner surface of each compartment.

Figure 13:
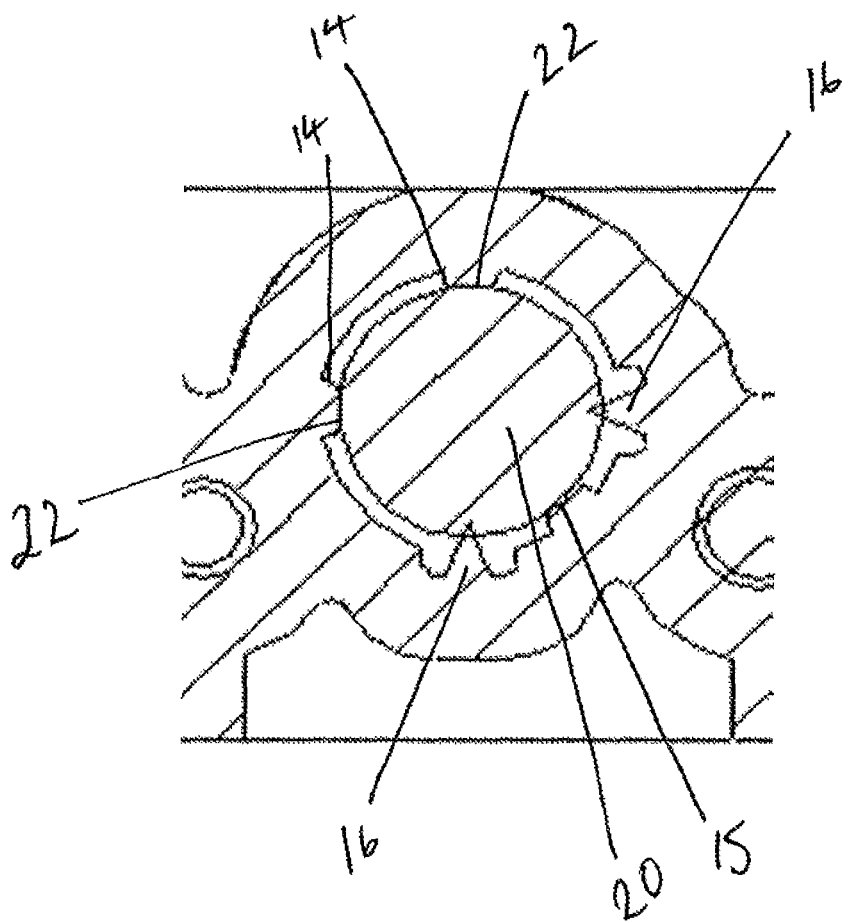
FIG. 13 illustrates an example of an LED inserted into a compartment.

The control pads 14 are configured to provide a contact surface 22 see FIG. 13) for the LEDs to control the alignment and position of each of the plurality of LEDs within each of the plurality of compartments. The contact surface of each control pad may be shaped so as to be complementary to a surface of the LED or photodiode so that a portion of the LED or photo detector abuts a substantial portion of the contact surface. The control pads force an LED or photo detector inserted into said compartment to be both centred and coaxial within the compartment. The control pads therefor control the alignment of the LEDs and the photo detectors within the compartments.

The control pads are resilient so that the dimensions of the control pads define the alignment of the LEDs and photodiodes within the housings.

In one example, at least one control pad is provided close to an end of each compartment to limit the insertion of the LED or photodiode into the compartment. The centre pad 15 is provided at one end of the compartment 12 to prevent the LED 20 or photodiode from being inserted too far into the compartment 12 as shown in FIG. 13.

In one example, a control pad may be used on a spacer to control the insertion of the LED or the photo detector into the compartment.

A number of protrusions 16 are provided in the form of ribs. Any suitable structure which effectively enables insertion of the LED or photodiode into the compartment and then urges the LED or photodiode toward the control pad is envisaged. The protrusions may be resiliently deformable upon insertion of an LED or photodiode.

The compartments 12 may be shaped to substantially complement the shape of the LED or photodiode. In one example, the compartments 12 are substantially tubular.

Figure 14:
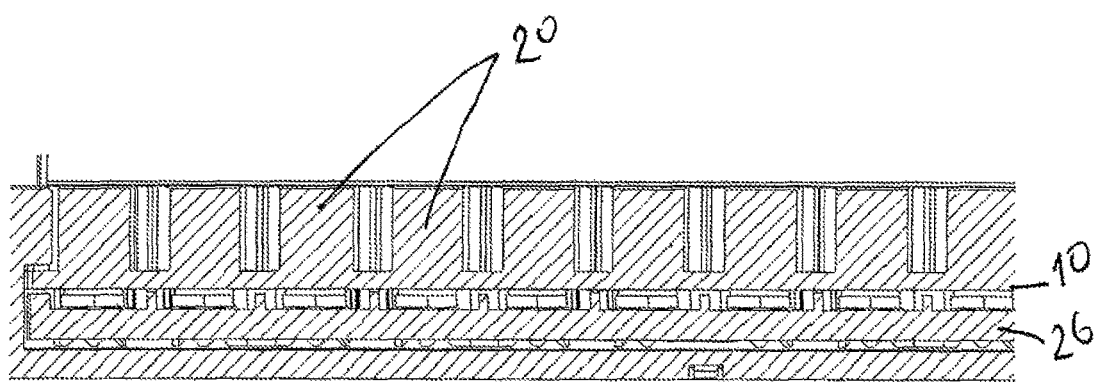
FIG. 14 illustrates a view of a portion of an example of an LED housing.

FIG. 14 shows the arrangement of the spacer 26 and the housing 10 for LEDs 10.

Figure 15:
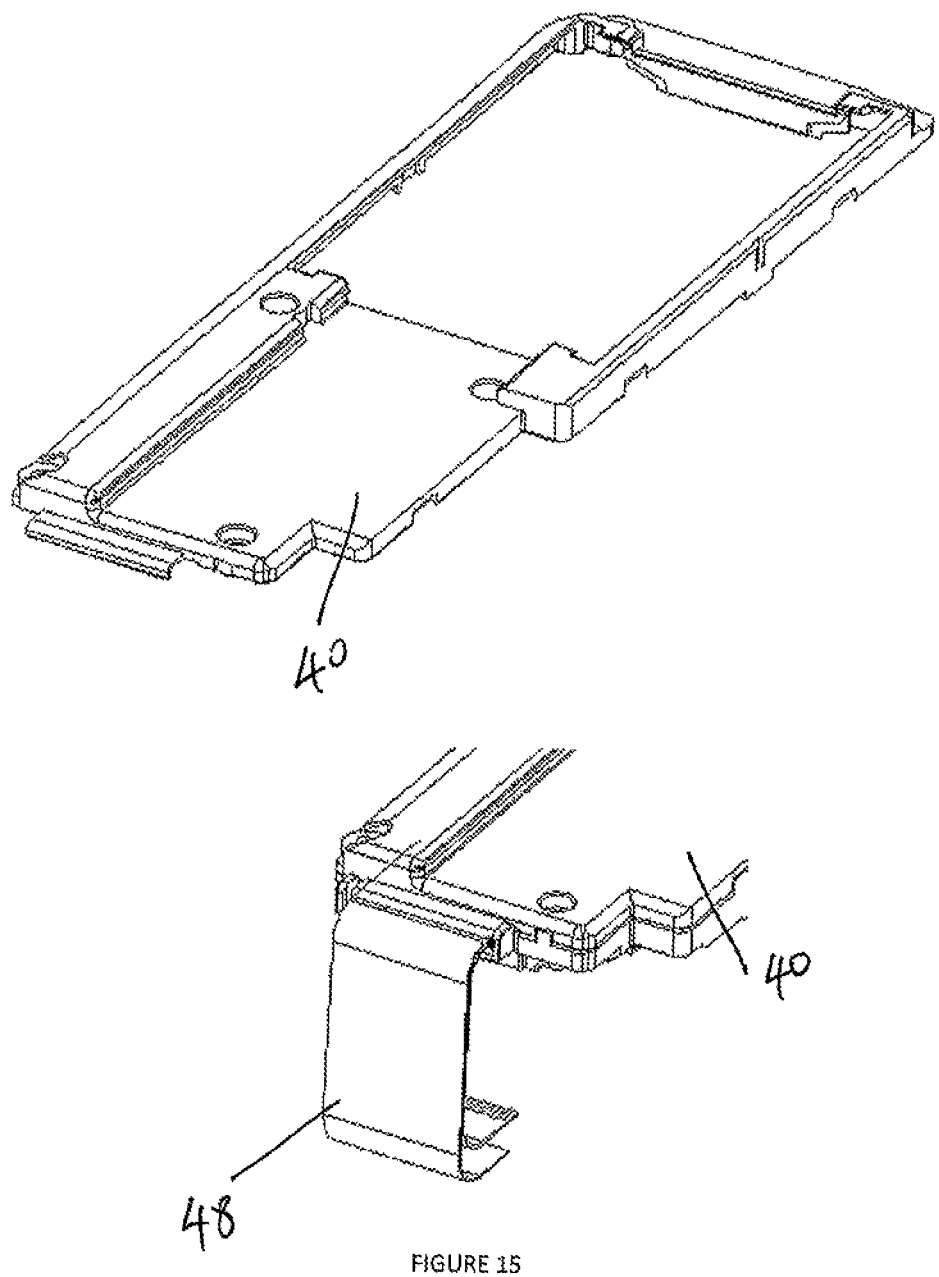
FIG. 15 illustrates an example of the casing.
Figure 16:
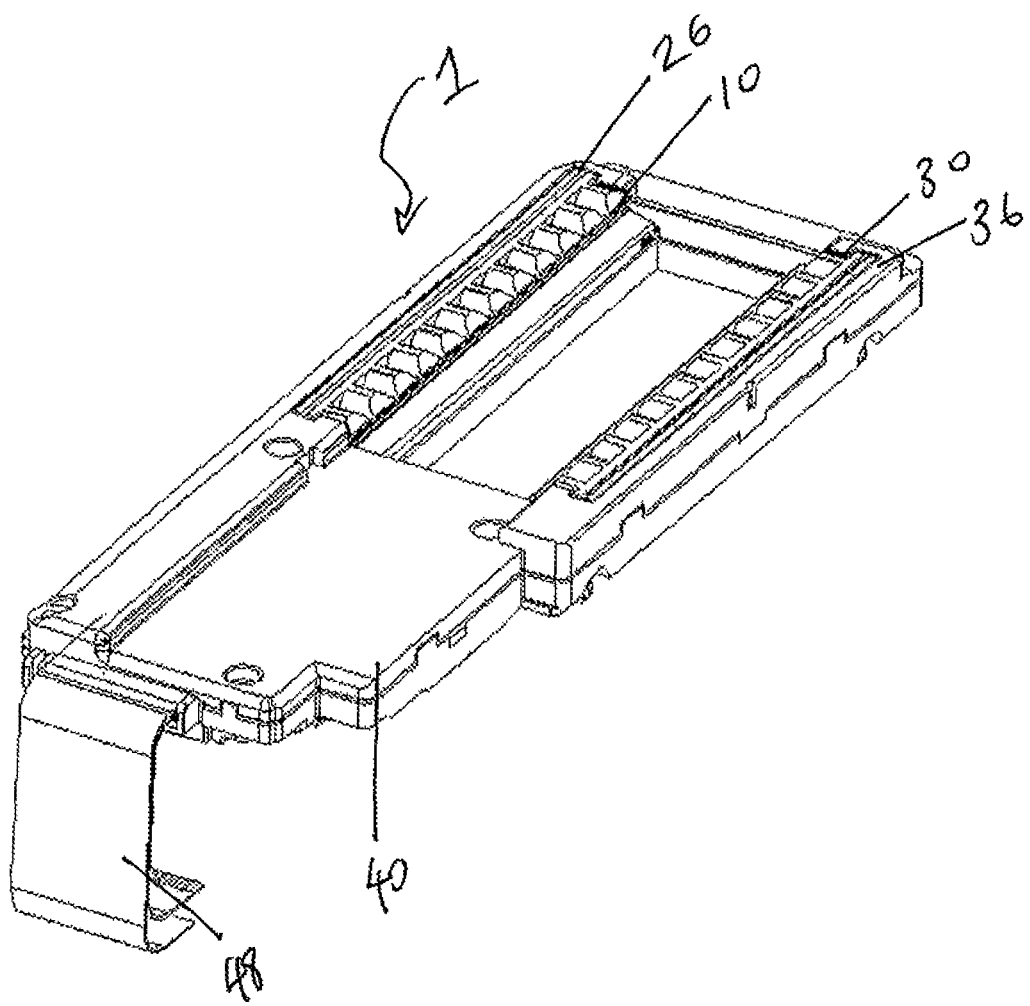
FIG. 16 illustrates an example of a detector array.

The casing 40 may be provided with clips 48 as shown in FIGS. 15 and 16 defining two cables; the first cable may be for power and the second cable may be for data transmission. The clip may also provide ease of insertion of the detector array into the printer.

In an example, the method includes arranging the detector array in a printer, so that a plurality of droplets ejected from a print element pass through the detector array. The presence of a droplet ejected from the print element is detected by identifying the difference between light emitted from the LED and light detected by the photo detector. If the print element is operating correctly, the droplet will vary the amount of light expected to arrive at the photo detector because the droplet will intersect the path of light emitted from the LED. Thus, the detector array will be able to identify whether the print element is operating correctly.

The detector array may be configured to identify the presence of different droplet sizes and may be configured to identify whether the print element is spitting and not operating correctly.

The benefit of a detector array including a plurality of LEDs or a plurality of photodiodes is that a greater number of nozzles in the print element may be diagnosed simultaneously because a plurality of detectors are operation at the same time. As such, the time required to detect a problem with a nozzle is reduced.

The challenge with arranging a plurality of light sources and photo detectors is that alignment of each light source and photo detector is difficult. Furthermore, as multiple light sources and photo detectors are arranged in a housing, misalignments between each light source and photo detector are compounded making it increasingly difficult for the detector array to adequately detect for drops. One of the benefits of the housings is that each light sensor and each photo detector in the housing is individually aligned within each compartment relative to the housing by the alignment elements and control pads. As a result, any small deviations caused by manufacturing tolerances are not compounded and the alignment of the light sources and photo detectors relative to the housing and to each other is improved.

In one example, the detector array is arranged close to a print element. The spacing between nozzles in the print element is small and therefore the separation of light sources and photo detectors in the detector array is similarly small. Consequently a high level of alignment is required between neighbouring LEDs and neighbouring photo detectors. Furthermore, a high level of alignment is required between opposing LEDs and photo detectors in order to adequately detect droplets ejected from the print element.

Further benefits are provided by the alignment features of the housings within the casing of the detector array allowing the alignment of the first and second housing in an opposed arrangement such that each light source and each light sensor is arrange in an aligned and opposed arrangement. The alignment features enable each light source or photo detector to have a high level of within each compartment. Because the tolerance between each light source and photo detector are not added together within the house, a high level of overall alignment is achieved within the The housing may be manufactured from a resilient plastics material. The housings may be formed using an injection moulding method or other method that allows accurately dimensioned components.

The housings and detector array allows the drop detector to have multiple sensors and therefore detect the nozzle health in a print element more quickly. As a result, the drop detection procedure within a printer is completed at an increased rate.

In an example, the method of manufacturing the drop detector includes the following steps: inserting a plurality of light sources and photo detectors into a plurality of compartments in a first housing and in a second housing according to claim 1 or 2; positioning the first housing comprising a plurality of light sources on a casing via a first connector; positioning the second housing comprising a plurality of photo detectors on a casing via a second connector; and aligning the first housing and the second housing in a substantially parallel, opposed relationship with a space between them such that each light source is aligned opposite a photo detector.

It is envisaged that the housings and the detector array may be used in other systems where a material passes through a detector and the detector ascertain the alignment of the device used to eject material.

The invention claimed is:

1. A detector array comprising:
   a first housing including a first plurality of compartments for housing a plurality of light sources, each compartment of the first plurality of compartments having a plurality of first control pads projecting inwardly and first protrusions, wherein the first control pads are configured to provide a first contact surface for the light sources to control the alignment and position of each of the plurality of light sources within each of the first plurality of compartments, and each of the first protrusions are configured such that, when the light sources are received in each compartment of the first plurality of compartments, each of the first protrusions is configured to apply pressure at a point on a corresponding light source from the plurality of light sources against the respective first control pads;
   a second housing including a second plurality of compartments for housing a plurality of photo detectors, each compartment of the second plurality of compartments having a plurality of second control pads projecting inwardly and second protrusions, wherein the second control pads are configured to provide a second contact surface for the photo detectors to control the alignment and position of each of the plurality of photo detectors within each of the second plurality of compartments, and each of the second protrusions are configured such that, when the photo detectors are received each compartment of the second plurality of compartments, the second protrusions are configured to apply pressure at a point on a corresponding photo detector from the plurality of photo detectors against the respective second control pads; and
   a casing comprising a connector for connecting the first housing and a photodiode housing to the casing, and a number of alignment elements, the alignment elements providing means for aligning the first housing and the second housing in a substantially parallel, opposed relationship with a space between them such that each light source, when installed, is aligned opposite a photo detector,
   wherein at least two alignment elements are provided to align each of the first housing and the second housing in the casing, and wherein the alignment elements are pins providing additional alignment of each of the first and second housing in a direction along a longitudinal axis of the pins.

2. A detector array according to claim 1, wherein the control pads are resilient so that the dimensions of the control pads define the alignment of the light sources and photo detectors within the first and second housings respectively.

3. A detector array according to claim 1 or 2, wherein at least two connectors are provided to connect each of the first and second housings in the casing.

4. A detector array according to claim 1, wherein a space is provided between a back edge of each of the first and second housings and an edge of casing.

* * * * *